United States Patent
Hottovy et al.

(10) Patent No.: US 7,999,044 B2
(45) Date of Patent: Aug. 16, 2011

(54) SYSTEM AND METHOD FOR DEINVENTORY OF POLYMERIZATION REACTOR

(75) Inventors: John D. Hottovy, Kingwood, TX (US); John H. Tait, Stafford, TX (US); David H. Burns, Houston, TX (US); Donald W. Verser, Houston, TX (US); James E. Hein, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 345 days.

(21) Appl. No.: 12/204,566

(22) Filed: Sep. 4, 2008

(65) Prior Publication Data

US 2010/0056707 A1 Mar. 4, 2010

(51) Int. Cl.
*C08F 2/00* (2006.01)
*B01J 19/00* (2006.01)

(52) U.S. Cl. .............................. 526/68; 526/70; 422/138

(58) Field of Classification Search ................... 526/68, 526/70; 422/138
See application file for complete search history.

(56) References Cited

U.S. PATENT DOCUMENTS

| 4,469,560 A | 9/1984 | Morgan |
| 4,888,704 A * | 12/1989 | Topliss et al. ................. 700/269 |
| 5,315,054 A | 5/1994 | Teel |
| 7,585,924 B2 | 9/2009 | Grady |

FOREIGN PATENT DOCUMENTS

| EP | 0 415 427 A2 * | 8/1990 |
| EP | 0415427 A2 | 6/1991 |

OTHER PUBLICATIONS

International Search Report and Written Opinion, mailed Nov. 30, 2009.

* cited by examiner

*Primary Examiner* — William K Cheung
(74) *Attorney, Agent, or Firm* — Fletcher Yoder

(57) ABSTRACT

A flash chamber sized to receive the effluent discharged from a polyolefin reactor during normal operation of the reactor and during a reactor dump, advantageously eliminating a reactor dump tank or alternate flash tank from the equipment outlay of a polyolefin manufacturing process. The flash chamber is sized to hold at least the polyolefin solids discharged from the reactor. A condenser fluidically coupled to an overhead portion of the flash chamber is sized to condense the flow rate of vaporized hydrocarbon (e.g., diluent, monomer, etc.) discharged overhead from the flash chamber during normal operation and during the reactor dump.

6 Claims, 4 Drawing Sheets

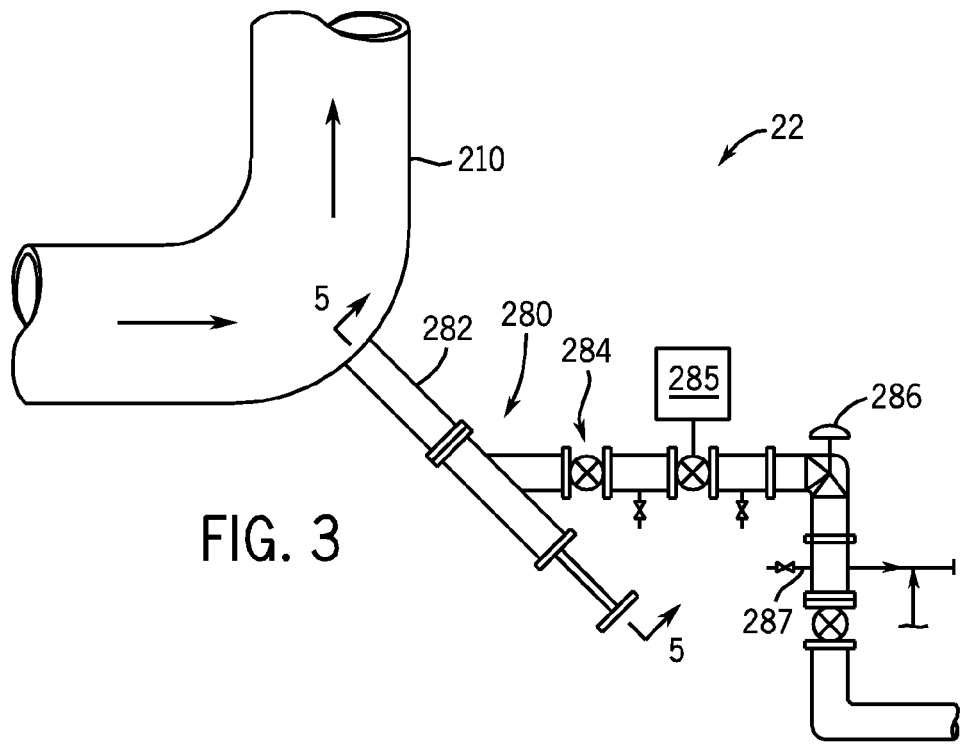
FIG. 3
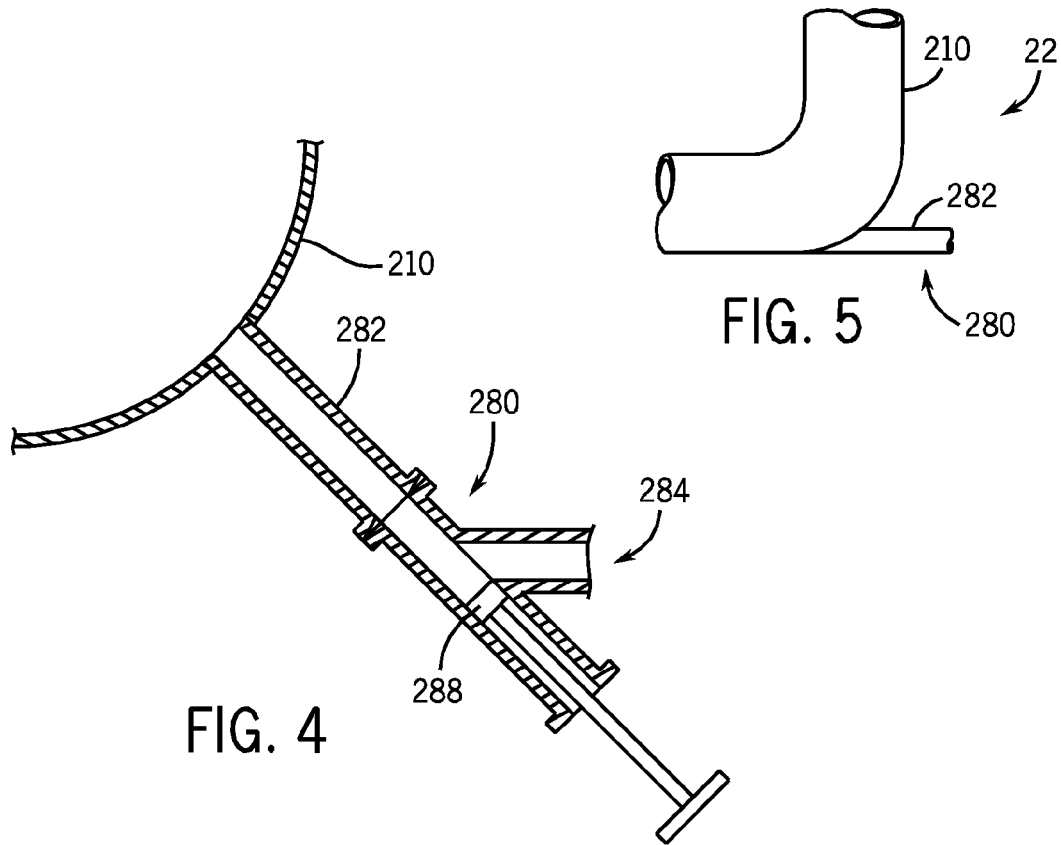
FIG. 4
FIG. 5

SYSTEM AND METHOD FOR DEINVENTORY OF POLYMERIZATION REACTOR

FIELD OF THE INVENTION

The present invention relates generally to polyolefin production and, more specifically, to efficiently accommodating the rapid deinventory of the polymerization reactor in an upset condition (i.e., a reactor dump).

DESCRIPTION OF THE RELATED ART

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such as thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed at or near petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a chromium oxide containing hexavalent chromium on a silica support. Further, a diluent may be introduced into the reactor. The diluent may be an inert hydrocarbon, such as isobutane, propane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent.

The discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system, to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

Fortunately, technological advances over the years in raw materials, equipment design and operation, and the like, have provided great strides in reducing the operating and capital costs of polyolefin manufacturing systems. However, the competitive business of polyolefin production drives manufacturers to improve their processes in order to lower operating and capital costs. Moreover, in an industry where billions of pounds of polyolefin product are produced per year, small incremental improvements, for example, in catalyst activity, monomer yield, energy efficiency, diluent recovery, and so forth, can generate significant cost savings in the manufacture of polyolefins.

An area in need of improvement is the recovery of polymer and hydrocarbon (e.g., diluent, monomer, etc.) discharged from the reactor during abnormal operation or an upset condition. The loop reactor may be dumped (i.e., quickly deinventoried) during certain upset conditions, such as an electrical power outage, loss of circulation in the loop reactor (e.g., due to shutdown of the loop pump), loss of coolant flow to the reactor jackets, overpressure of the reactor, and so on. In these events, the reactor may be dumped (rapidly deinventoried) to avoid plugging, fouling and/or fusing of polymer solids in the reactor. Indeed, with loss of circulation and the associated slurry velocity, for example, heat-transfer from the reactor contents to the cooling medium (e.g. water) in the reactor jacket is significantly reduced. Again, in this and other abnormal operating scenarios, the reactor may be emptied to a reactor dump tank, alternate flash tank, blowdown tank, etc., instead of discharged to the flash tank employed during normal operation to receive product slurry from the loop reactor. Unfortunately, the reactor contents sent to a dump tank may not be recovered.

Typically, diluent and monomer that flashes from the reactor dump tank are sent to flare for combustion because the normal flash recovery system is generally not configured or is undersized to accommodate the vapor discharging from the dump tank. Further, the polyolefin fluff solids that discharge from the bottom of the dump tank are generally collected in containers for disposal, resulting in loss production of polyolefin. Unfortunately, the polyolefin disposed as a result of reactor dumps may represent up to 1% or greater of the polyolefin produced throughout the life of the loop reactor.

BRIEF DESCRIPTION OF THE DRAWINGS

Advantages of the invention may become apparent upon reading the following detailed description and upon reference to the drawings in which:

FIG. 3 is a diagrammatical representation of an exemplary continuous takeoff discharge of the polymerization reactor of FIG. 2 in accordance with one embodiment of the present techniques;

FIG. 4 is a cross section along line 5-5 of FIG. 3 showing a ram valve arrangement in the continuous take off discharge assembly in accordance with one embodiment of the present techniques;

FIG. 5 is a diagrammatical representation of a tangential location for the continuous take off assembly in accordance with one embodiment of the present techniques.

DETAILED DESCRIPTION OF SPECIFIC EMBODIMENTS

Figure 1:
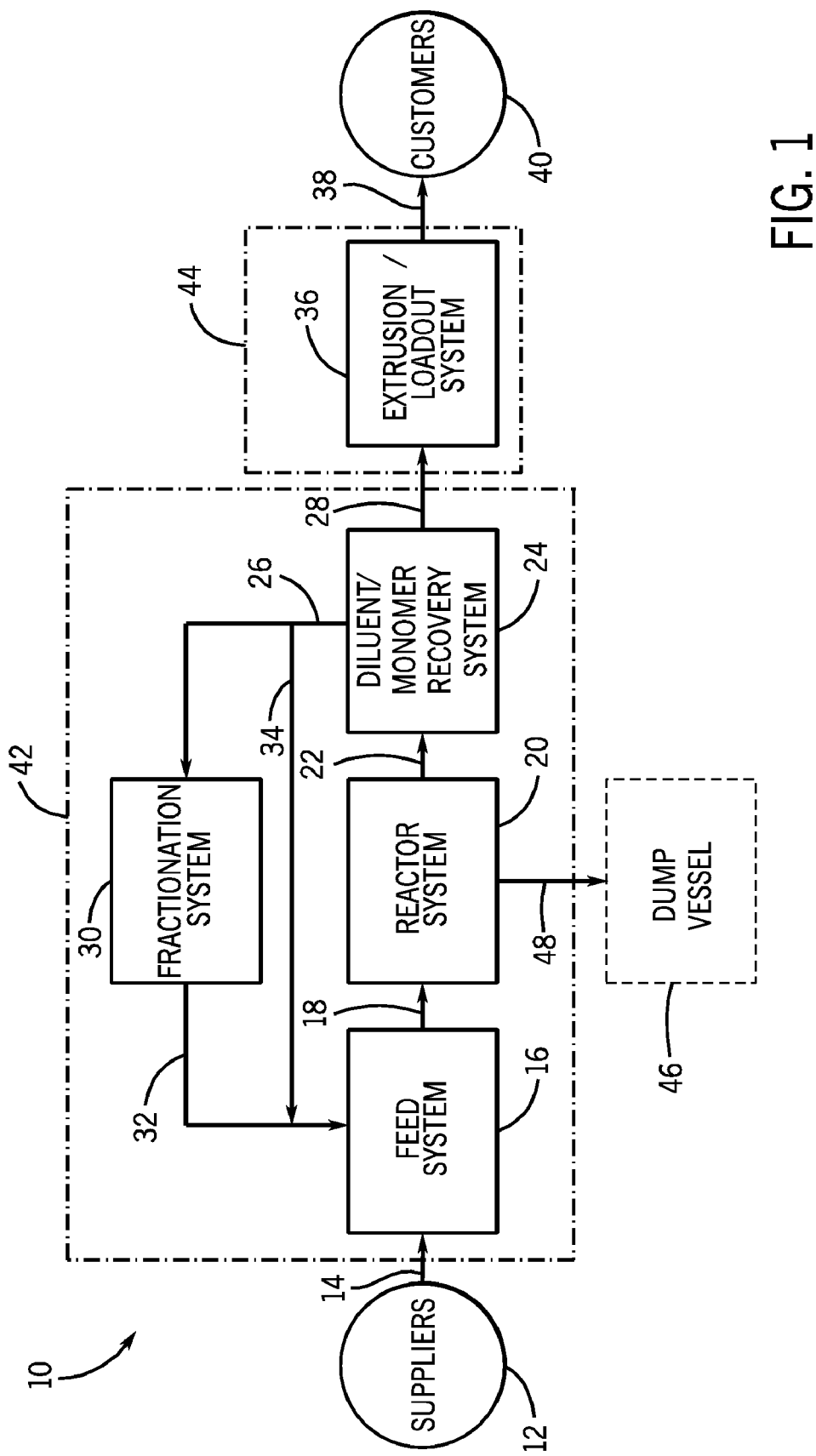
FIG. 1 is a block flow diagram depicting an exemplary polyolefin manufacturing system for producing polyolefins in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an upset condition that may cause the polyolefin reactor to foul or plug, for example, the reactor may be dumped or deinventoried to a dump tank or alternate flash tank, e.g., in about 10 minutes to about 20 minutes, about 10 minutes to 30 minutes, etc. The dump tank is typically sized to hold the reactor solids and any un-vaporized diluent from the reactor. The vaporized diluent is typically sent to the flare. In many cases, the conventional diluent recovery system is undersized to handle the relatively larger amount of diluent flashed in the dump tank during a reactor dump. As discussed, the upset condition may be caused by a power failure, failure of the reactor circulation pump, failure of the reactor coolant pump, failure of the diluent feed pump, and so on. The dump tank may also be used during start-up of the reactor, or during a transition from one polyolefin grade product to another, especially with reactors employing a settling-leg discharge configuration where unstable control is more likely to form large particles (i.e., chunks or lumps) of polyolefin which can plug or foul downstream equipment. The capital cost of a reactor dump tank or AFT generally is in the range of 1-3% of the total equipment costs for a polyolefin manufacturing plant.

The present techniques are directed to combining the separate functions of processing the normal effluent and dump effluent discharged from the polymerization reactor. As a result, in the manufacture of polyolefin diluent and polymer, recovery may be increased, and capital and operating costs reduced. In certain embodiments, the flash vessel and dump tank (or alternate flash vessel) are combined into a single vessel, thus eliminating a vessel from the equipment outlay of the polyolefin manufacturing process. Moreover, processing of the contents of the reactor discharged during a reactor dump (e.g., upon loss of reactor circulation in the reactor) in the flash vessel instead of in a dump tank or alternate flash tank (AFT), recovers the polyolefin product solids (e.g., sent to the downstream purge column) which may otherwise be disposed if collected in a dump tank. Further, the flashed hydrocarbon (diluent and monomer) is not flared, but is recovered and recycled to the reactor via the typical recovery system. Thus, diluent and monomer losses are reduced and the flare size requirements may be lowered. Loss production of polyolefin is reduced. Moreover, employment of the continuous take-off discharge of the loop reactor, as opposed to a settling leg discharge, for example, may further facilitate use of the flash vessel to capture a reactor dump or deinventory by providing for improved particle size distribution (i.e., less large particles or chunks). Large particles could be problematic in the typical flash vessel and downstream equipment.

For retrofit of an existing flash vessel to incorporate the additional function of processing effluent discharge during a reactor dump (e.g., upon loss of reactor circulation), the flash vessel may be increased in size to hold the solid and un-vaporized liquid contents of the reactor. The overhead condenser of the flash vessel may be increased in size to accommodate the increased rate of vapor flow from the flash chamber (experienced during a reactor dump or rapid deinventory of the reactor contents). Again, combining the flash vessel and the alternate flash tank (AFT) (or dump tank) into a single vessel provides for reduced capital and operating costs in the manufacture of polyolefin.

To facilitate discussion of the present techniques, the disclosure is presented in sections. Section I introduces an exemplary polyolefin production process, which includes a feed system, reactor system, fractionation system, diluent/monomer recovery system, and extrusion/loadout system. Section I gives examples of polyolefin applications and end-uses, and discusses exemplary control of a polyolefin production process. Section II discusses the exemplary reactor system and conditions for a reactor dump. Section III discusses an exemplary diluent/monomer recovery system, which receives a reactor discharge (effluent), and includes an exemplary flash chamber. Section IV discusses the implementation of a continuous takeoff (CTO) for the polymerization reactor discharge. Section V summarizes exemplary methods for retrofitting and operating a polyolefin manufacturing process for combining functions of the flash chamber and alternate flash tank (AFT) (or dump tank).

I. Polyolefin Production Process—An Overview

Turning now to the drawings, and referring initially to FIG. 1, a block diagram depicts an exemplary manufacturing process 10 for producing polyolefins, such as polyethylene, polypropylene, and/or their copolymers. The exemplary manufacturing process 10 is typically a continuous operation but may include both continuous and batch systems. An exemplary nominal capacity for the exemplary manufacturing process 10 is about 400-800 million pounds of polyolefin produced per year. Exemplary hourly design rates are approximately 50,000 to 100,000 pounds of polymerized/extruded polyolefin per hour. It should be emphasized, however, that the present techniques apply to polyolefin manufacturing processes having nominal capacities and design rates outside of these exemplary ranges.

Various suppliers 12 may provide reactor feedstocks 14 to the manufacturing system 10 via pipeline, trucks, cylinders, drums, and so forth. The suppliers 12 may comprise off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler-Natta catalysts, chromium catalysts, and metallocene catalysts), co-catalysts (such as triethylaluminum, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20.

B. Reactor System

The reactor system 20 may comprise one or more reactor vessels, such as liquid-phase or gas-phase reactors. The reactor system 20 may also comprise a combination of liquid and gas-phase reactors. If multiple reactors comprise the reactor system 20, the reactors may be arranged in series, in parallel, or in any other suitable combination or configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. An olefin-free diluent or mineral oil may be used, for example, in the preparation and/or delivery of the catalyst to the polymerization reactor.

Further, diluent may be fed into the reactor, typically a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as explained below, may also be used for reactor flushes. Some polymerization processes may not employ a separate diluent, such as in the case of selected polypropylene production where the propylene monomer itself may act as the diluent.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

C. Diluent/Monomer Recovery, Treatment, and Recycle

The discharge 22 of the reactors within system 20 may include the polymer fluff as well as non-polymer components, such as diluent, unreacted monomer/comonomer, and residual catalyst. In construction of the reactor in certain embodiments, a discharge 22 nozzle and conduit may be installed (e.g., welded) at a tap or hole cut into the reactor wall. The discharge 22 exiting the reactor through the discharge nozzle may be subsequently processed, such as by a diluent/monomer recovery system 24, to separate non-polymer components 26 (e.g., diluent and unreacted monomer) from the polymer fluff 28. The diluent/monomer may be flashed in recovery system 24 to separate the diluent/monomer from the fluff 28.

The untreated recovered non-polymer components 26 (e.g., diluent/monomer) may be further processed, such as by a fractionation system 30, to remove undesirable heavy and light components. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30, and thus permitting a smaller fractionation system 30. Generally, in certain technologies, at least some of the diluent is processed in a fractionation system 30 to provide for catalyst preparation/delivery in the feed system 16 and reactor flushes in the reactor system 20. In certain embodiments, up to 80-95% of the diluent discharged from the reactor bypasses the fractionation system in route to the polymerization reactor. As a result, the size of the fractionation columns and associated capital and energy costs may be reduced.

As for the fluff 28, it may be further processed within the recovery system 24 and in the extrusion/loadout system 36, to prepare it for shipment, typically as pellets 38, to customers 40. Although not illustrated, polymer granules intermediate in the recovery system 24 and typically containing active residual catalyst may be returned to the reactor system 20 for further polymerization, such as in a different type of reactor or under different reaction conditions. The polymerization and diluent recovery portions of the polyolefin manufacturing process 10 may be called the "wet" end 42 or "reaction" side of the process 10, and the extrusion/loadout 36 portion of the polyolefin process 10 may be called the "dry" end 44 or "finishing" side of the polyolefin process 10.

D. Extrusion/Loadout System

In the extrusion/loadout systems 36, the fluff 28 is typically extruded to produce polymer pellets 38 with the desired mechanical, physical, and melt characteristics. Extruder feed may comprise additives, such as UV inhibitors and peroxides, which are added to the fluff products 28 to impart desired characteristics to the extruded polymer pellets 32. An extruder/pelletizer receives the extruder feed, comprising one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company LP, of The Woodlands, Tex., USA.

E. Customers, Applications, and End-Uses

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 38 may be further processed and assembled for distribution and sale to the consumer. For example, a polyethylene milk bottle may be filled with milk for distribution to the consumer, or the fuel tank may be assembled into an automobile for distribution and sale to the consumer. To form the end-products or components from the pellets 38 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on.

1. Blow Molding, Injection Molding, and Rotational Molding

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

2. Downstream Extrusion Processes

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal. Finally, polyolefin pellets may also be supplied for the extrusion coating and lamination industry.

3. Blown Film and Cast Film

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths.

F. Exemplary Control of Polyolefin Production

Process variables in the manufacturing system 10 may be controlled automatically and/or manually via valve configurations, control systems, and so on. In general, a control system, such as a processor-based system, may facilitate management of a range of operations in the polyolefin manufacturing system 10, such as those represented in FIG. 1. Polyolefin manufacturing facilities may include a central control room or location, as well as a central control system, such as a distributed control system (DCS) and/or programmable logic controller (PLC). Of course, the reactor system 20 typically employs a processor-based system, such as a DCS, and may also employ advanced process control known in the art. The feed system 16, diluent/monomer recovery system 24, and fractionation system 30 may also be controlled by the DCS. In the dry end of the plant, the extruder and/or pellet loading operations may also be controlled via a processor-based system (e.g., DCS or PLC).

A DCS may be as simple as one PLC remotely connected to a computer located in a field office. Larger systems may be PLC based, but also consist of specially designed cabinets containing equipment used to provide input/output (I/O) and communication devices. A distributed system may allow remote nodes to operate independently of the central control facility should the facility go off line or lose communication capability. Remote nodes may store process data used to operate in the event of such a failure.

The control system(s) in the manufacturing process 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, fluid composition, solids, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

The control systems may be wired and/or wireless, and offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system on the other. Moreover, as indicated, the control system typically includes hardware/software for control, interface, database management, and so on. In operation, the control system may transfer data and commands using communication protocols such as Ethernet or other open standards, or a proprietary standard, depending upon the DCS vendor, for example. Proprietary protocols may require specialized equipment to perform their functions.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. Authorization schemes generally afford a degree of security, ensuring that only properly trained and authorized personnel operate the various parts of the facility via the HMI and control system.

II. Polymerization Reactor System

A. Reactor Configuration

Figure 2:
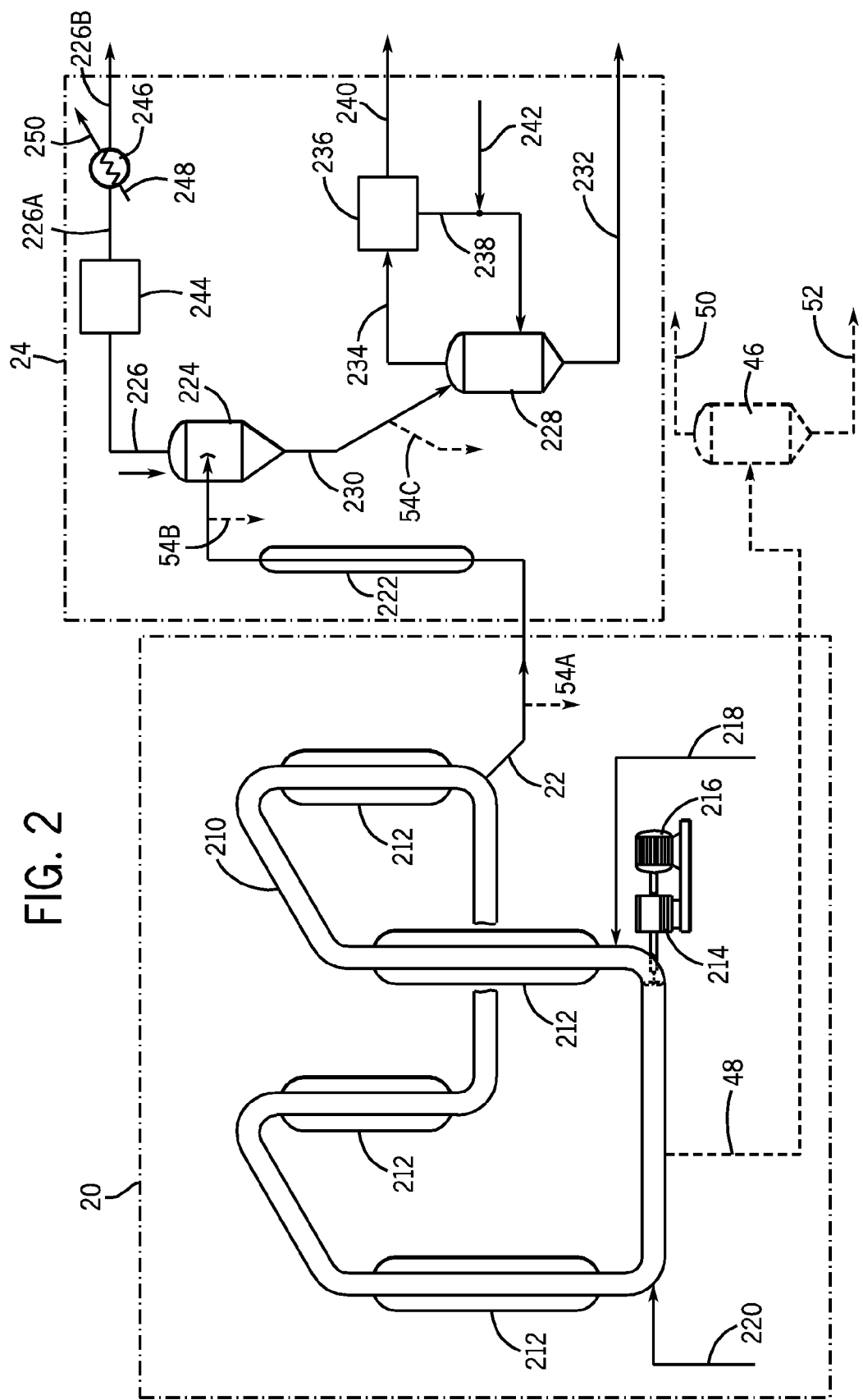
FIG. 2 is a process flow diagram of an exemplary reactor system and a diluent/monomer recovery system of the polyolefin manufacturing system of FIG. 1 in accordance with one embodiment of the present techniques.

Referring to FIG. 2, a process flow diagram of an exemplary polymerization reactor system 20 (of FIG. 1) and diluent/monomer recovery system 24 (also of FIG. 1) are depicted. As discussed above, the reactor system 20 may comprise one or more polymerization reactors, which may in turn be of the same or different types. Furthermore, in multiple reactor systems, the reactors may be arranged serially or in parallel. Whatever the reactor types comprising the reactor system 20, a polyolefin particulate product, generically referred to as "fluff" herein, is produced. To facilitate explanation, the following examples are limited in scope to specific reactor types believed to be familiar to those skilled in the art and to single reactors or simple combinations. To one skilled in the art, however, the present techniques are simply and easily applicable to more complex reactor arrangements, such as those involving additional reactors, different reactor types, and/or alternative ordering of the reactors or reactor types. Such arrangements are considered to be well within the scope of the present invention.

One reactor type comprises reactors within which polymerization occurs within a liquid phase. Examples of such liquid phase reactors include autoclaves, boiling liquid-pool reactors, loop slurry reactors, and so forth. For simplicity, a loop slurry reactor 210 for producing polyethylene (and its copolymers) will be discussed in the context of the present techniques though it is to be understood that the present techniques are similarly applicable to other types of liquid phase reactors.

The loop slurry reactor 210 is generally composed of segments of pipe connected by smooth bends or elbows. The reactor 210 may be used to carry out polyethylene polymerization under slurry conditions in which insoluble particles of polyolefin, such as polyethylene or polypropylene are formed in a fluid medium and are suspended as slurry until removed. A motive device, such as pump 214, circulates the fluid slurry in the reactor 210. An example of a pump 214 is an in-line axial flow pump with the pump impeller disposed within the interior of the reactor 210 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 216 or other motive force.

The fluid medium within the reactor 210 may include olefin monomers and comonomers, diluent, co-catalysts (e.g., triethylboron, methyl aluminoxane, alkyls such as triethylaluminum, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 218, which generally corresponds to one of the feed streams 18 of FIG. 1.

Likewise, a catalyst, such as those previously discussed, may be added to the reactor 210 via a conduit at a suitable location, such as depicted at feed stream 88, which may include a diluent carrier and which also generally corresponds to one of the feed streams 18 of FIG. 1. An example of a catalyst for polymerizing the ethylene monomer and comonomers which are present includes a chromium oxide containing a hexavalent chromium (or $Cr^{+2}$) on a silica support. It should be explained that in certain embodiments the chromium in the catalyst feedstock is received at the polyolefin facility as $Cr^{+3}$. This catalyst may be subjected to a carbon monoxide (CO) activation process resulting in a valence change to $Cr^{+6}$ in the activated catalyst. Subsequently, during polymerization in the reactor, the $Cr^{+6}$ valence in the activated catalyst changes to $Cr^{+2}$ due to the presence of monomer (e.g., ethylene) in the polymerization contents in the reactor. Advantageously, the $Cr^{+2}$ sites in the catalyst are active for polymerization. However, it should be emphasized, as previously discussed, that a variety of catalyst systems other than chromium systems may be employed.

In total, the added components in the reactor generally compose a fluid medium within the reactor 210 within which the catalyst is a suspended particle. The reaction conditions, such as temperature, pressure, and reactant concentrations, are regulated to facilitate the desired properties and production rate of the polyolefin in the reactor, to control stability of the reactor, and the like. Temperature is typically maintained below that level at which the polymer product would go into solution. As indicated, due to the exothermic nature of the polymerization reaction, a cooling fluid may be circulated through jackets 212 around portions of the loop slurry reactor 210 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the reactor 210, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 210 via a settling leg or other means, such as a continuous take-off, as depicted discharge stream 22. In downstream processing, the polyolefin discharged from the reactor may be extracted from the slurry and purified.

B. Particle Size of Polyolefin in the Reactor

The particle size range or distribution of the polyolefin fluff in the reactor may vary depending on the polymerization catalyst employed, polymer product, and reaction conditions. For example, an Englehard Lynx 100 catalyst on average produces smaller polymer particles than those produced using a Davidson 969 MS Chrome catalyst. In general, a catalyst may be employed which, due to the catalyst size, shape, reactive surface area, or other catalyst activity characteristic, produces polymer particles in the desired size range. In particular, the size of the polymer particles produced by a catalyst generally varies proportionally with the catalyst particle size; that is, smaller catalysts generally produce smaller polymer particles. The weight percentage of different sized polymer particles may vary between catalysts and generally corresponds to the catalyst particle size. Further, reactor operating conditions, such as slurry density, temperature, residence time, and so on, may be modulated to adjust the particle size distribution.

The particle size distribution is generally specified to maintain suitable slurry conditions in a loop slurry reactor running under reaction conditions such as those discussed with regard to FIG. 1. Further, the particle size distribution is typically specified to facilitate downstream processing of the polyolefin fluff. In particular, the particle size range may be designated to reduce the presence of excessively-large particles which may foul downstream equipment including the flash vessel (or flash chamber, flash separator, etc.), purge column, and so forth. Such a reduction of larger particles facilitates elimination of the reactor dump tank or alternate flash tank (AFT).

In one embodiment, the catalyst and operating conditions employed produce less than 1% by weight of polymer particles that are greater than 1,500μ across. In another embodiment, less than 5% by weight of the polymer particles are greater than 1000μ across. In yet another embodiment, less than 0.1% by weight of the polymer particles are greater than 1,500μ across and/or less than 0.5% by weight of the polymer particles are greater than 1000μ across. At the other extreme, to avoid problems associated with excessive numbers of fine particles, in one embodiment, less than 5% by weight of the polymer particles are less than 100μ across and, in another embodiment, less than 0.5% by weight of the polymer particles are less than 100μ across. Furthermore, in yet another embodiment, more than 70% by weight of the polymer particles are between 300μ and 500μ across and, in an additional embodiment, more than 80% by weight of the polymer particles are between 300μ and 500μ across. In yet another embodiment, more than 90% by weight of the polymer particles are between 300μ and 500μ across.

III. Diluent/Monomer Recovery System

A. Flash Chamber

The discharge 22 from the reactor 210 may flow through an in-line flash heater 222 and into a flash chamber 224. The in-line flash heater 222 may be a surrounding conduit that uses steam or steam condensate, for example, as a heating medium to provide indirect heating to the discharge 22. Thus, the loop slurry reactor 210 effluent (discharge 22) is heated prior to its introduction into the flash chamber 224. Also, before the discharge 22 enters the flash chamber 224, water or other catalysts poisons may be injected into the discharge 22 to deactivate any residual catalysts in the discharge 22 stream. Because these injected components are catalysts poisons by definition, they are typically completely removed, or at least substantially removed, from any recovered material (e.g., monomer or diluent) recycled to the reactor 210.

In the flash chamber 224, most of the non-solid components of the reactor discharge 22 are withdrawn overhead as vapor in the flash gas 226. Note, it is this recycled flash gas 226 that may bypass the fractionation system in route to the reactor 210 (i.e., via the feed system 16). In polyethylene production, this vapor is typically primarily diluent, such as isobutane or other diluents previously mentioned. It may also contain the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent employed. In contrast, heavy components or "heavies" may be defined as those components having higher boiling points than the diluent. An exemplary approximate composition of the flash gas 226 is 94 wt. % isobutane, 5 wt. % ethylene, and 1 wt. % other components. A level or volume of fluff may be maintained in the flash chamber 224 to give additional residence time of the fluff in the chamber 224 to facilitate separation of liquid and vapor entrained in the porous fluff particles.

The flash gas 226 may be processed in solids-removal equipment 244 (see, e.g., FIG. 6) such as cyclones, bag filters, etc., where entrained fluff solids (e.g., typically fine particles or fines) are removed and returned to the flash chamber 224 or to downstream equipment, such as the purge column 228 discussed below. The flash gas 226 may also travel through a deoxygenation bed, for example. Furthermore, the flash gas 226 may be cooled or condensed in a heat exchanger 246 (e.g., shell-and-tube construction) prior to its recycle to the feed system 16 or fractionation system 30. To reduce size and costs of the fractionation system 30, a portion of the flash gas 226, treated flash gas 226A, and/or condensed flash gas 226B may bypass the fractionation system 30 and return more directly (e.g., via line 34 of FIG. 1) to the reactor 210 via the feed system 16.

The heat exchanger 246 may have a coolant supply 248 and a coolant return 250. The coolant employed may be cooling tower water, for example. The present techniques may provide for increasing the size of the heat exchanger 248 (con-densor) to accommodate the additional mass of diluent and monomer discharged from the reactor (in a dump or abnormal operation) to the flash vessel 224 (instead of to the dump vessel 46).

As for the solids (polymer) in the flash chamber 224, they are withdrawn with a small amount of entrained diluent (and monomer) and sent to a purge column 228 via solids discharge 230. As will be appreciated by those of ordinary skill in the art, the solids discharge 230 conduit may include valve configurations that allow polymer to flow downward through the conduit while reducing the potential for vapor to flow between the purge column 228 and the flash chamber 224. For example, one or more rotary or cycling valves may be disposed on the solids discharge 230 conduit. Furthermore, one or more relatively small fluff (surge) chambers may also be disposed on the conduit. Traditionally, the fluff solids from the flash chamber has discharged into a lower pressure flash chamber, with the lower pressure flash gas requiring compression for recycle to fractionation system 30 and reactor. However, elimination of a low pressure flash (and the associated compression) provides for discharge of the fluff solids from the flash chamber 224 to the purge column 228. Such a discharge to the purge column may include appropriate valve configurations, a surge chamber, or simply a conduit, and so on.

B. Purge Column

The primary solids feed to the purge column 228 is typically the solids discharge 230 (polyolefin fluff) that exits the flash chamber 224. A purpose of the purge column 228 is to remove residual hydrocarbon from the entering solids streams and to provide substantially-clean polymer fluff 232. The fluff 232 may be transported or conveyed to the extrusion/loadout system 36 for conversion to pellets 38, and for distribution and sale as polyolefin pellet resin to customers 40. In general, the treated polymer particles discharged from purge column 228 as polymer fluff 232 may be processed in a conventional finishing operation, such as a screw extruder, in the extrusion/load out system 36 (FIG. 1).

In the exemplary purge column system illustrated, nitrogen is circulated through purge column 228 to remove residual hydrocarbons via overhead discharge 234. This discharge 234 may be sent through a separation unit 236, such as a membrane recovery unit, pressure swing adsorption unit, refrigeration unit, and so forth, to recover nitrogen via nitrogen stream 238, and to discharge a separated hydrocarbon stream 240 as feed to the fractionation system 30. In the art, the separation unit 236 may be known as an Isobutane Nitrogen Recovery Unit (INRU). Moreover, fresh nitrogen 242 may be added to the nitrogen circuit to account for nitrogen losses in the purge column 228 system. Finally, it should be noted that the hydrocarbon stream 240 may beneficially provide feed to the fractionation system 30. For example, the hydrocarbon stream 240 discharging from the separation unit 236 makes available hydrocarbon feed that may be processed to give the olefin-free diluent used in catalyst preparation.

C. Alternate Configurations

As will be appreciated by those of ordinary skill in the art, a variety of configurations may be employed in the diluent/monomer recovery system 24. For example, the solids discharge 230 from the flash chamber 224 may be sent to another reactor (e.g., a gas phase reactor) instead of to the purge column 228 or to a low-pressure flash chamber. If discharged to another reactor, catalyst poison may not be injected upstream in the discharge 22, and, thus, residual active catalysts remain for further polymerization.

In another configuration, the purge column 228 may be eliminated from the recovery system 20 and combined with the downstream extruder feed tank. The separation unit 236 associated with the purge column 228 may be relocated to accommodate the extruder feed tank if desired. Thus, the high process pressure in the flash chamber 224 may be utilized to convey the fluff particles in solids discharge 230 to the extrusion/loadout system 36, eliminating a blower system (and associated electrical consumption) traditionally used to convey the fluff 232 to the extrusion/loadout system. In addition, the process pressure in the flash chamber 224 may be used to transport the fluff particles in a dense phase conveying arrangement, thus lowering the velocity of the flowing particles and reducing transport damage to the particles.

D. Combined Flash Chamber/Reactor Dump Tank

FIG. 2 depicts a conventional dump vessel 46 for receiving a slurry discharge 48 from the reactor during an abnormal or dump event. The slurry dump discharge 48 may be positioned at one or more locations around the loop reactor 210. Discharge valving or relief valves may discharge to the dump vessel 46, for example, during loss of circulation of the slurry, overpressure of the loop reactor 210, and so on. In the dump vessel 46, the liquid portion of the slurry flashes and is discharged in the overhead stream 50 to a flare, for example, for combustion, or to other systems to reduce emissions and/or recover energy, for example. The solids and any entrained hydrocarbon may discharge out the bottom of the dump vessel 46 via solids stream 52. Typically, as discussed, the solid stream 52 is generally not recovered but disposed. In accordance with the present techniques, the dump vessel 46 may be eliminated. Instead, a dump of the reactor slurry or discharge of the reactor slurry during abnormal operation may discharge through the normal discharge 22 (e.g., continuous take-off) to the flash vessel 224. The flash chamber 224 and associated equipment (e.g., overhead condenser) may be sized accordingly.

In conventional configurations, reactor slurry or solids may also enter the dump vessel 46 from other points in the system downstream of the loop reactor 210. For example, as indicated by reference numerals 54A, 54B, and 54C, the dump vessel 46 may receive slurry or polymer from an conduit 54A coupled to the reactor discharge 22 downstream of the continuous take-off, conduit 54B downstream of the flash line 222 and upstream of the flash vessel 224, and/or conduit 54C which discharges downstream of the flash vessel 224 and upstream of the purge column 228. However, again, with elimination of the dump vessel 46 in certain embodiments, the flash vessel 224 may accommodate a dump discharge from the loop reactor 210 (through the discharge 22 and flash line 222, the normal operation flow path).

IV. Continuous Take Off of the Reactor Effluent Discharge

FIGS. 3-5 illustrate a continuous take-off (CTO) mechanism of the reactor discharge 22. The CTO mechanism relative to a settling-leg configuration generally provides for a more desirable particle size distribution of the polyolefin fluff exiting the reactor during start-up and shutdown of the reactor. The reduced presence of excessively-large polyolefin particles mitigates use of a reactor dump tank or alternate flash tank (AFT) during start-up and shutdown. Referring to FIG. 3, a continuous takeoff mechanism 280 disposed on a pipe elbow of the loop slurry reactor 210 is depicted. The continuous takeoff mechanism 280 includes a take-off cylinder 282, a slurry withdrawal line 284, an emergency shut-off valve 285, proportional motor valve 286 to regulate flow, and a flush line 287. The reactor 210 may be operated "liquid" full, and because the reactor liquid contents are slightly compressible, pressure control of the liquid through the system may be accomplished with a valve. Further, where diluent input is held substantially constant, the proportional motor valve 286 may be used to control the rate of continuous withdrawal and to maintain the total reactor pressure within designated set points.

Referring to FIG. 4, which is taken along section line 5-5 of FIG. 3, a smooth-curved pipe elbow having the continuous take-off mechanism 280 is depicted. Thus, the illustrated pipe elbow may be considered an appendage-carrying elbow. As shown, the mechanism includes take-off cylinder 282, which is attached, in this instance, at a right angle to a tangent to the outer surface of the elbow. Further, coupling to the cylinder 282 is the slurry withdrawal line 284. Disposed within the take off cylinder 282 is a ram valve 288, which may serve at least two purposes. First, it may provide a clean-out mechanism for the take-off cylinder if it should ever become fouled with polymer. Second, it may serve as a shut-off valve for the entire continuous take-off assembly.

FIG. 5 shows an attachment orientation for the take-off cylinder 282, which is affixed tangentially to the curvature of the elbow and at a point just prior to the slurry flow turning upward. The opening may be elliptical to the inside surface, for example, and further enlargement may be implemented to improve solids take-off. It should be noted that a variety of orientations of the attachment of the take-off cylinder 282 may be implemented. For example, the cylinder may be attached to the reactor 210 perpendicular to a tangent of the reactor elbow as shown in FIG. 4 or tangent to the reactor elbow outer surface as depicted in FIG. 5 or at any angle there between. The cylinder 282 may be cut off flush with the inside surface of the reactor or may extend into the reactor. One implementation is for the cylinder 282 to have its attachment end cut off at a 45 degree angle. In this case, it may be mounted so that the shorter edge of the 45 degree cut is placed flush with the reactor 210 elbow outer radius and the longer edge of the 45 degree cut protruding into the reactor flow. This may facilitate capture of more solids and less diluent from the reactor, thus further increasing the solid concentration of the discharged slurry. Other orientations and locations may be implemented.

V. Update and Operation of the Reactor and Diluent/Monomer Recovery Systems

The present techniques accommodate the combining of the function of the dump tank (sometimes labeled as an alternate flash tank) with the flash chamber 224. Beneficially, this may reduce the capital cost associated with construction of a polyolefin manufacturing facility. Other advantages may include reduction in the gas sent to the flare during a reactor dump situation and a reduction in flare size at some facilities. While the present techniques may be employed with the traditional settling leg discharge of the loop reactor, the use of the flash chamber 224 to accommodate a reactor dump situation may be more beneficial with the continuous discharge from the reactor. As discussed, this is due to the typically better particle size distribution (i.e., less lumps and chunks of polymer) that discharge from the continuous discharge. It should be noted that clean out provisions may be made for the flash vessel 224 in case polymer chunks and undesirable materials are discharged from the reactor 210 to the flash chamber 224.

Further, because the polymer slurry is sent to the flash tank 224 in a reactor dump situation instead of to the dump vessel 46, the amount of polymer sent out as scrap (i.e., material that would be discharged from the dump tank 46 to scrap containers for disposal) is reduced. Scrapped polymer due to reactor dumps may represent up to 1% or greater of the polyolefin produced throughout the life of the loop reactor. Beneficially, with the present techniques, the polymer received from the reactor during a reactor dump may be recovered and extruded as off-specification pellets, for example.

In addition, transport of polymer from the flash vessel 224 to the purge column (or to a low pressure flash vessel) may occur over a long distance. This is so because of the high pressure in the flash vessel 224, as compared to the lower pressure realized in the former dump vessel 46. Advantageously, this higher pressure differential may allow the combined dump tank/flash tank to be located on the ground to reduce vessel support structure and the associated costs.

Figure 6:
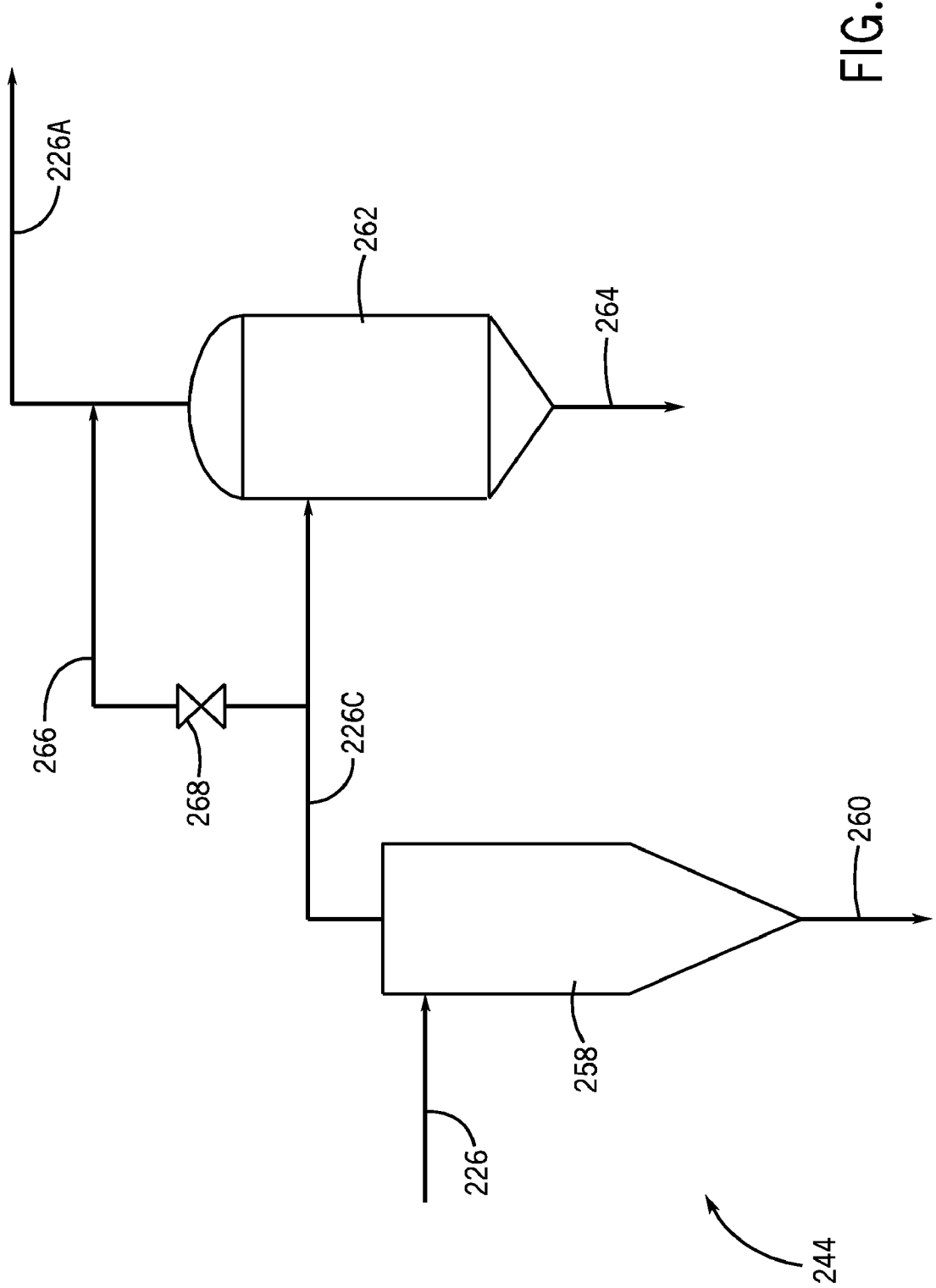
FIG. 6 is a process flow diagram of solids-recovery equipment employed to recover fine particles or fines from the overhead stream discharging from the flash vessel depicted in FIG. 2 in accordance with one embodiment of the present techniques.

The solids-removal equipment 244 overhead of the flash chamber 224 may be increased in size to handle the increased flow of flash gas that may be realized during a reactor dump event. Referring to FIG. 6, exemplary solids-removal equipment 244 is depicted. The flash gas 226 from the flash chamber 224 may enter a cyclone 258 (e.g., a high efficiency cyclone that knocks out a majority of the entrained solids in the flash gas 226). The solid stream 260 may discharge at the bottom of the cyclone 258 and be recycled to the purge column 228, for example. The flash gas 226C exiting the overhead of the cyclone 258 may enter a bag filter 262 where any additional solids are removed via solids discharge 264 from the bottom of the bag filter 262. The flash gas 226B may then exit the overhead of the bag filter 262 in route to the heat exchanger 246 (e.g., in the illustrative embodiment of FIG. 2), fractionation system 30, and/or feed system 16 (e.g., via stream 34), for example. It should be noted that the flash gas 226B may be further processed, such as in a deoxygenation bed, prior to entering the heat exchanger 246 (e.g., condenser), fractionation system 30, and/or feed system 16.

In certain embodiments, it may be beneficial to bypass the bag filter 262 in a reactor dump event. In other words, while a high efficiency cyclone 258 may accommodate the increased flow of flash gas 226 realized during a reactor dump situation, the bag filter 262 may be undersized in certain events. Accordingly, a bypass line 266 and bypass valve 268 are depicted for bypassing the bag filter 262. On the other hand, the bag filter 262 may be increased in size to accommodate the flow of flash gas 226 discharged from the loop reactor 210 in a reactor dump event.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for operating a polyolefin production process, comprising:
    polymerizing monomer in the presence of catalyst in a polymerization reactor to form polyolefin;
    processing effluent of the polymerization reactor in a flash vessel during normal operation;
    processing effluent of the polymerization reactor in the flash vessel during a reactor dump; and
    recovering a majority of the polyolefin and hydrocarbon in the effluent discharged from the polymerization reactor during a reactor dump.

2. The method as recited in claim 1, wherein recovering comprises recycling the hydrocarbon to the polymerization reactor.

3. The method as recited in claim 1, wherein recovering comprises condensing hydrocarbon vapor discharged from the flash vessel.

4. The method as recited in claim 1, wherein recovering comprises transporting the polyolefin from the flash vessel to a purge column.

5. The method as recited in claim 1, wherein the polymerization reactor is not in communication with a reactor dump tank or alternate flash tank (AFT).

6. The method as recited in claim 1, wherein the reactor dump comprises a deinventory of the contents of the polymerization reactor in about 10 minutes to about 30 minutes.

* * * * *